Sept. 4, 1934. J. D. TAYLOR 1,972,205
INDICATING DEVICE OR THE LIKE
Filed Oct. 5, 1933
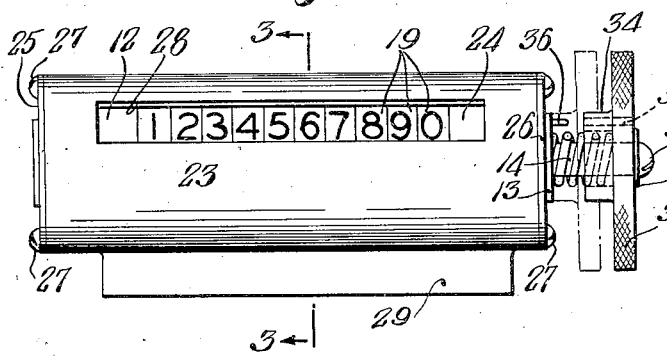
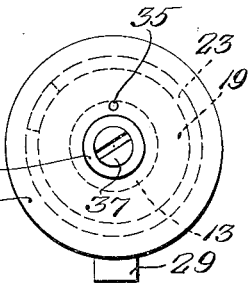
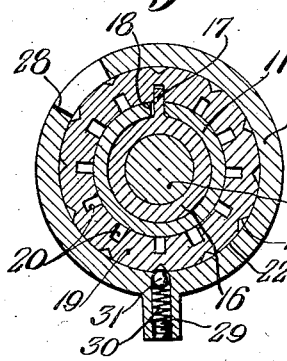
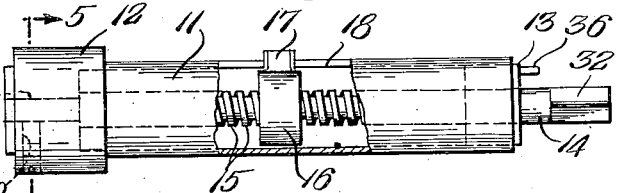
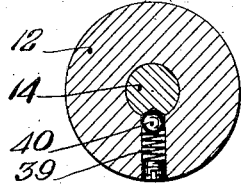
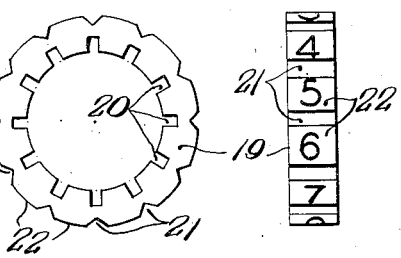
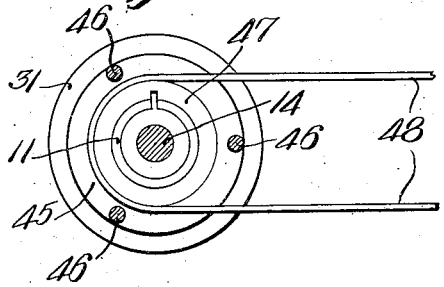
Inventor
James D. Taylor
by Arthur D. Thomson
his Attorney Patented Sept. 4, 1934

1,972,205

UNITED STATES PATENT OFFICE 1,972,205

INDICATING DEVICE OR THE LIKE

James D. Taylor, Quincy, Mass.

Application October 5, 1933, Serial No. 692,285

10 Claims. (Cl. 40—68)

This invention relates to a mechanical device for selecting and actuating one of a series of rotatable rings or discs which may display a series of index characters or which may constitute a control or driving element for moving remote indicating apparatus or the like. The principal purpose of the invention is to provide a compact, efficient and durable instrument of this type, which may accommodate any desired number of rotatable discs and which may be operated by turning a single handle or operating member. More specific objects reside in the structural features of the device herein described, and will be pointed out in the appended claims.

Recommended embodiments of the invention are illustrated in the accompanying drawing, in which:

Fig. 1 is a front elevation of the improved apparatus, arranged as a numeral indicator;

Fig. 2 is an end view looking to the left of Fig. 1;

Fig. 3 is an enlarged section on line 3—3 of Fig. 1;

Fig. 4 is an elevation, partly in section, of a rotatable sleeve forming part of the device;

Fig. 5 is a section on line 5—5 of Fig. 4;

Fig. 6 is a plan view of one of the rotatable rings which surround the sleeve;

Fig. 7 is an edge view of Fig. 6; and

Fig. 8 is a transverse section, partly in end elevation, of a modification in which the discs are employed to turn a belt for moving a remote indicator.

In the embodiment chosen for the purpose of illustration in Figs. 1 to 7, the improved device comprises a tubular sleeve 11 having an enlarged bearing 12 at one end and an interior plug or hub 13 fixed in its opposite end; a worm shaft 14 journaled in the bearing and hub respectively and having its threads 15 extending substantially from end to end of the hollow sleeve; and a follower or nut 16 movable along the worm upon rotation of the shaft, and provided with a key 17 projecting outwardly through a longitudinal slot 18 in the sleeve.

A series of juxtaposed, independently rotatable rings or discs 19 are mounted on the sleeve 11, and each of the discs has a plurality of regularly-spaced, interior radial slots 20 which receive the key 17 of the actuator 16 when said slots are moved into registry therewith. The periphery of each disc is divided by intermediate notches 21 into a plurality of segments or faces 22, preferably corresponding in number to the slots 20. When the key is brought into engagement with one of the complemental slots of a selected ring by rotation of the worm shaft 14, that ring may be rotated in either direction by turning the sleeve 11.

A tubular casing 23 surrounds the rings and fits upon the bearing 12 and upon a collar 24 corresponding thereto at the opposite end of the sleeve. The casing or housing may be secured by end washers 25 and 26 fastened thereto by screws 27 or otherwise. An elongate window opening 28 of the casing discloses the indicating faces 22 of the rings 20, which may display numerals as shown, or other index characters. The casing preferably has a thickened wall portion or rib 29 having a series of openings 30 containing a spring-pressed ball or locking member 31 engageable with the notches 21 of the respective rings for yieldingly holding the rings in proper position with respect to the window opening and the selector key 17.

The worm 15 and the sleeve 11 are independently rotated by a single operating member, such as the knob or hand wheel 31 which fits on a squared projecting end 32 of the shaft 14, and which is slidable inwardly on said shaft against the resistance of a coiled spring 33. The hub 34 of the knob has an opening 35 which is adapted to receive a pin or stud 36 projecting from the hub 13 of the sleeve 11, when the knob is forced inwardly. A screw 37 and washer 38 retain the hand wheel on the shaft end.

Hence, when the knob or handle is in normal or outward position, its rotation will cause the worm 15 to turn, thus moving the follower or actuator 16 longitudinally thereon and carrying the key 17 along the sleeve slot 18 and through the aligned slots 20 of the successive rings 19 until it is engaged with the particular ring selected for rotation the sleeve itself remaining stationary during this operation. The pitch of the threads 15 may be such that the key moves from one ring to the next adjacent ring upon one complete revolution on the shaft. Proper operative position of the key may thus be determined and maintained by stop means operative releasably to lock the shaft with respect to the sleeve. For this purpose, the bearing 12 may have an aperture 39 containing a spring-pressed ball 40 which snaps into a complemental notch or recess in the shaft end, as shown in Fig. 5.

After the desired ring has been selected in this manner, the handle 31 is pushed inwardly (as indicated by broken lines in Fig. 1) to engage the pin 36 of the sleeve hub, and again turned to rotate the ring and bring a predetermined index number to the casing window. After releasing the hand wheel, another ring may be selected and rotated, and the operation may be repeated whenever desired.

It is obvious that the size and number of the rings 19 and the character of the indicia appearing thereon will depend entirely upon the intended purpose of the device; and that the particular arrangement herein disclosed is chosen merely to indicate the general operation and adaptability of the apparatus. The indicator may set up and display a multi-digit number, such as the mileage of an automobile to remind the operator when an oil change is due; it may show letters arranged in words or sentences as a changeable advertising or display medium; it may combine letters or words with numbers to display a date, as in a desk calendar; or it may be adapted and employed for other indicating or display purposes, such as in a combination lock.

The improved device may also serve as an actuator or control for operating remote movable elements, as indicated in Fig. 8, in which the housing or frame for the apparatus comprises a pair of headers 45 forming trunnions for the sleeve 11 (one header or end piece being shown in the drawing) and interconnected by longitudinal bars or spacer rods 46. In this case, the respective rings 47 are arranged to drive belts 48 which may be suitably connected to a complemental series of rotating rings or to other movable devices for display or advertising purposes, or the like. It is apparent that the driving connection with the rings 47 may include suitable gearing or other mechanism for transmitting motion in accordance with common practice; and it will be understood that the specific structural details of the apparatus herein described may be varied to suit particular purposes without departing from the essence of this invention as defined in the following claims.

I claim:

1. A mechanical device of the class described, comprising a sleeve member having a longitudinal slot in its wall, an actuator movable longitudinally within the sleeve and having a key projecting through said slot, a series of rotatable rings encircling the sleeve, said rings having a plurality of slots arranged to receive said key, means for moving said actuator to engage the key in a slot of a selected ring, and means for revolving the sleeve and actuator to rotate said ring, said means including a single operative element connected with said actuator and movable into engagement with said sleeve.

2. A mechanical device of the class described, comprising a sleeve member having a longitudinal slot in its wall, a follower movable longitudinally within the sleeve and having a key projecting through said slot, a series of rings encircling the sleeve and rotatable thereon, said rings having a plurality of slots arranged to receive said key, a shaft extending through said sleeve and having a threaded portion engaged by the follower, and common means for rotating said shaft to move the follower key into engagement with a selected ring, and for revolving the sleeve to rotate said rings.

3. A mechanical device of the class described, comprising a sleeve member having a longitudinal slot in its wall, a follower movable longitudinally within the sleeve and having a key projecting through said slot, a series of rings encircling the sleeve and rotatable thereon, said rings having a plurality of slots arranged to receive said key, a shaft extending through said sleeve and having a worm portion engaged by the follower and a projecting end of polygonal cross section, and a handle on said end for rotating the shaft to move the follower key into engagement with a selected ring, said handle being movable on the shaft and the handle and sleeve having mutually engageable elements whereby the sleeve may be revolved to rotate said ring by turning the handle after it is moved into said engagement.

4. A mechanical device of the class described, comprising a sleeve member having a longitudinal slot in its wall, a follower movable longitudinally within the sleeve and having a key projecting through said slot, a series of rings encircling the sleeve and rotatable thereon, said rings having a plurality of slots arranged to receive said key, a worm shaft extending through said sleeve and having a squared projecting end, the follower engaging the worm and being moved longitudinally thereof upon rotation of the shaft, and a knob on said squared end, the knob being movable along the shaft toward the adjacent end of the sleeve and the knob and sleeve end having a separable pin and slot connection, whereby the knob may be turned to rotate the shaft and also revolve the sleeve after engaging said connection by moving the knob inwardly.

5. A mechanical device of the class described, comprising a sleeve member having a longitudinal slot in its wall, a follower movable longitudinally within the sleeve and having a key projecting through said slot, a series of rings encircling the sleeve and rotatable thereon, said rings having a plurality of slots arranged to receive said key, a worm shaft extending through sleeve and having a squared projecting end, the follower engaging the worm and being moved longitudinally thereof upon rotation of the shaft, a knob on said squared end, the knob being movable along the shaft toward the adjacent end of the sleeve and the knob and sleeve end having a separable pin and slot connection, whereby the knob may be turned to rotate the shaft while the knob is in outward position and also to revolve the sleeve after engaging said connection by moving the knob inwardly, and a spring between the knob and said sleeve end for normally holding the knob in outward position.

6. A mechanical device of the class described, comprising a sleeve member having a longitudinal slot in its wall, a follower movable longitudinally within the sleeve and having a key projecting through said slot, a series of rings encircling the sleeve and rotatable thereon, said rings having a plurality of slots arranged to receive said key, a worm shaft extending through said sleeve and having a squared projecting end, the follower engaging the worm and being moved longitudinally thereof upon rotation of the shaft, a knob on said squared end, the knob being movable along the shaft toward the adjacent end of the sleeve and the knob and sleeve end having a separable pin and slot connection, whereby the knob may be turned to rotate the shaft while the knob is in outward position and also to revolve the sleeve after engaging said connection by moving the knob inwardly, and means for yieldingly holding said rings in normal position with their slots aligned so that said key may pass freely therethrough.

7. A mechanical device of the class described, comprising a sleeve member having a longitudinal slot in its wall, a shaft extending through the sleeve, a follower geared to the shaft and having a key projecting through said slot, a series of rings encircling the sleeve and rotatable thereon, said rings having a plurality of interior slots arranged to be brought into alignment so that the key may pass therethrough, and the rings also having a plurality of exterior recesses, a housing for the device, stop means carried by the housing and releasably engaging in said recesses yieldingly to hold the rings in normal position with their respective slots in alignment, means for turning the shaft to move the follower and thereby engage its key in a slot of a selected ring, and means for revolving the sleeve to rotate said ring.

8. A mechanical device of the class described, comprising a sleeve member having a longitudinal slot in its wall, a shaft extending through the sleeve, a follower geared to the shaft and having a key projecting through said slot, a series of rings encircling the sleeve and rotatable thereon, said rings having a plurality of interior slots arranged to be brought into alignment so that the key may pass therethrough, and the rings also having a plurality of exterior recesses, a housing for the device, stop means carried by the housing and releasably engaging in said recesses yieldingly to hold the rings in normal position with their respective slots in alignment, bearings for said shaft, the shaft having a peripheral recess therein, means for turning the shaft to move the follower and thereby engage its key in a slot of a selected ring, stop means mounted in one of said bearings and releasably engaging in said recess when said key is in such engagement, and means for revolving the sleeve and key to rotate said ring.

9. A mechanical device of the class described, comprising a sleeve member having a longitudinal slot in its wall, a shaft extending through the sleeve, a follower geared to the shaft and having a key projecting through said slot, a series of rings encircling the sleeve and rotatable thereon, said rings having a plurality of interior slots arranged to be brought into alignment so that the key may pass therethrough, bearings for said shaft, the shaft having a peripheral recess therein, means for turning the shaft to move the follower and thereby engage its key in a slot of a selected ring, stop means mounted in one of said bearings and releasably engaging in said recess when said key is in such engagement, and means for revolving the sleeve and key to rotate said ring.

10. A mechanical device of the class described, comprising a sleeve having a longitudinal slot in its wall, a worm shaft extending through the shaft and having a squared projecting end, bearings for the shaft, a follower movable longitudinally along the worm shaft upon rotation thereof, and having a key projecting through said slot, a series of parallel juxtaposed rings encircling the sleeve and rotatable thereon, said rings having a plurality of interior slots arranged to be moved into alignment so that the key may pass under successive rings, and also having a plurality of exterior recesses, a housing surrounding the rings and having a longitudinal window opening disclosing portions of the several rings, a spring-pressed stop member mounted in one of said bearings and adapted to engage said shaft, the latter having a peripheral recess receiving said stop member releasably to hold the shaft against rotation, spring-pressed stops mounted in said housing and engageable in the exterior recesses of the respective rings for yieldingly holding the rings in normal position with their interior slots in alignment, a handle mounted on the squared end of the shaft for rotating the same to move the follower key into engagement with a selected ring, the handle being slideable inwardly along the shaft toward the adjacent end of the sleeve, and separable locking elements on the hand and sleeve end respectively, said elements being engaged upon inward movement of the handle, so that subsequent turning of the handle revolves the sleeve and rotates the selected ring.

JAMES D. TAYLOR.